Figure 1:
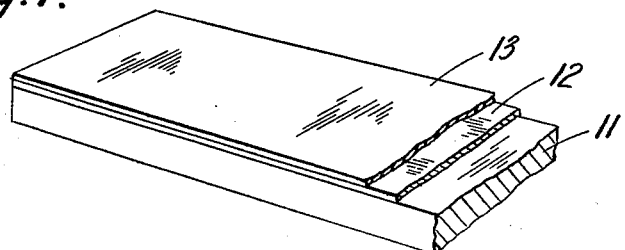

April 27, 1965   N. W. ELDERKIN ETAL   3,180,008
METHOD OF MANUFACTURING BEARINGS
Filed Sept. 15, 1961                            2 Sheets-Sheet 1

April 27, 1965  N. W. ELDERKIN ETAL  3,180,008
METHOD OF MANUFACTURING BEARINGS
Filed Sept. 15, 1961  2 Sheets—Sheet 2

3,180,008
METHOD OF MANUFACTURING BEARINGS
Norman Wallace Elderkin, London, and Guy Anthony Vandervell, Stoke Poges, England, assignors to Vandervell Products Limited, London, England, a British company
Filed Sept. 15, 1961, Ser. No. 138,352
Claims priority, application Great Britain, Sept. 19, 1960, 32,154/60
9 Claims. (Cl. 29—149.5)

This invention relates to method of manufacturing sliding bearings.

The method of the invention provides a composite strip for use in the manufacture of bearings which strip has a surface bearing layer of lead alloyed at least with indium and copper, the alloy containing 2–10% indium and 0.1–3% copper.

The surface bearing layer may additionally comprise 0.001–0.25% tellurium and small additions of silver and/or antimony up to 0.5%.

Preferably, the surface bearing layer consists of 4–10% indium, 0.1–0.5% copper, 0.001–0.25% tellurium and the remainder lead.

According to a feature of the invention, the process provides a surface bearing layer which overlies an intermediate layer which is a copper alloy containing 5–35% lead, preferably 24–29% lead. The copper alloy may also contain up to 20% tin, and up to 0.6% iron. Zinc may be substituted for all or part of the tin.

According to another feature of the invention, the intermediate layer is a cast layer on a steel backing, which may comprise 0.04–0.13% carbon, 0.25–0.45% manganese, up to 0.015% silicon, up to 0.05% sulphur, up to 0.05% phosphorus, and the remainder iron, which is a mild steel such as is specified as SAE 1010. Low alloy steel or medium carbon steel may also be used.

The invention provides a method of manufacturing a composite strip, as aforesaid, comprising casting onto a heated copper/lead alloy intermediate layer, a layer of a lead alloy at least comprising 2–10% indium under conditions such that diffusion of copper from the sub-layer into the lead alloy occurs so that the surface bearing layer so produced comprises 0.1–3% copper.

The intermediate layer may be produced on a steel backing by casting, sintering, or other convenient technique.

According to a preferred feature of the invention, a method of manufacturing a composite strip having a surface bearing layer which is a lead/indium alloy containing copper, comprises producing a backing strip having a copper alloy surface layer, heating the backing strip in a reducing atmosphere to a temperature above the melting point of the lead/indium alloy and below the melting point of the copper alloy, coating the copper alloy surface layer with a molten lead/indium alloy, and cooling the resulting strip to substantially room temperature in a selected time to control the diffusion of copper from the copper alloy into the lead/indium layer.

The microstructure of the resultant copper-containing lead-indium alloy has been found to be relatively simple and, apart from impurities, contains only two distinct phases. Firstly a lead matrix which contains most of the indium and a small amount of the copper in solid solution and, secondly, discrete particles of copper-indium uniformly dispersed through the lead-rich matrix. The copper-indium particles occur in two forms—larger acicular or star-shaped particles which are actually small dendrites of copper-indium that form as a solid precipitate in the molten lead-indium matrix, and very much smaller particles which precipitate as the molten lead-indium cools and solidifies.

The surface layer of the copper alloy unites with some of the molten indium during the coating operation. Some of the indium diffuses into the surface copper alloy grains to form a copper-indium inter-metallic layer, and some into the surface lead pools of the copper alloy to form lead-indium pools. Both the sliding properties and the corrosion resistance of the copper alloy are imprvoed by this diffusion of indium so that, in the event of mechanical damage and loss of the thin lead-indium based overlay, an improved bearing material is exposed for emergency running.

Experiments on the corrosion resistance of cast lead-indium-copper alloys have indicated that small copper contents improve corrosion resistance. In a cast overlay alloy, the copper combines with some of the indium to form discrete intermetallic particles (see above) thus decreasing the concentration of indium in solution in the lead. For this reason it is believed that the copper content should be held to low limits.

In particular it has been found that up to 0.5% of copper added to the lead-indium alloy improves the corrosion resistance of the cast alloy. No substantial increase in corrosion resistance is observed when the copper content is raised to 3%. Above this value, excessive hardening of the lead-indium base alloy takes place.

The preferred copper content is about 0.2% and this can be obtained by control of the temperatures and cooling rates of the composite three layer material immediately after application of the lead-indium alloy, although, if desired, some of the copper may be added to the molten lead-indium alloy before application.

The amount of copper dissolved in the lead alloy during strip coating is dependent partly on the time of contact between the molten lead alloy and the hot copper alloy (i.e. the time lapse before solidification occurs) and partly on the thicknesses of the three layers.

It has also been found that the addition of 0.001 to 0.25% tellurium to the molten lead-indium alloy further improves the corrosion resistance of the lead-based alloy.

Good corrosion resistance is obtained if the molten lead alloy contains 5% indium and 0.05% tellurium, and if the coating process is controlled to gain about 0.2% copper dissolved in the final lead alloy.

The addition of copper and tellurium improve the corrosion resistance of the lead-based alloy and allow a reduction in the expensive indium content. Similar effects are obtained with small additions of silver and antimony.

Figure 2:
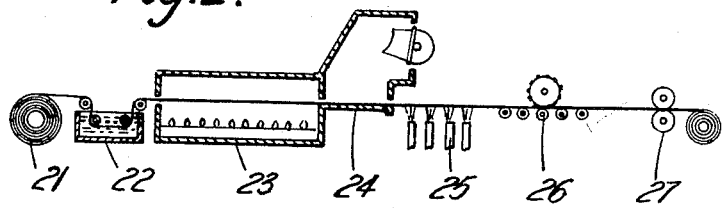
Figure 3:
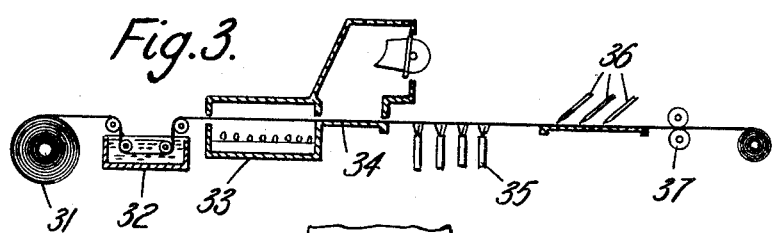
Figure 4:
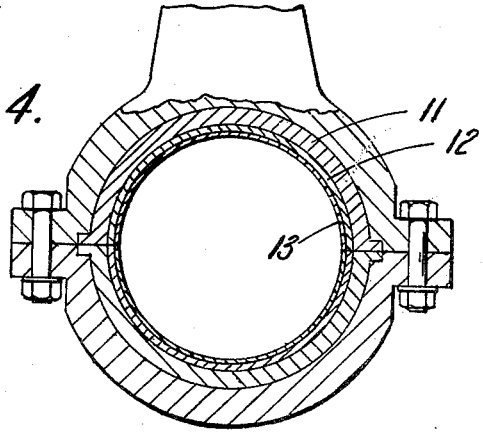
Figure 5:
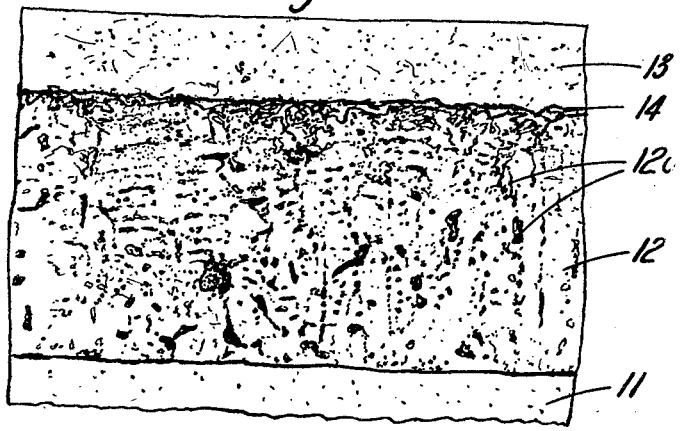
Figure 6:
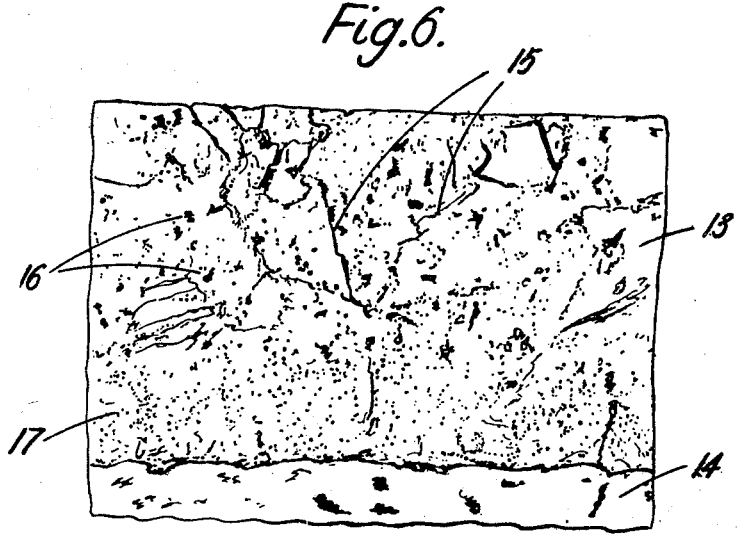

One specific construction of a composite strip according to the novel method of manufacture will now be described with reference to the accompanying drawings in which:

FIGURE 1 is a perspective view of the finished strip showing the separate layers, FIGURES 2 and 3 are diagrammatic illustrations of a method of producing composite strip, FIGURE 4 is a section through a bearing assembled in a connecting rod, and FIGURES 5 and 6 are diagrammatic illustrations of the microstructure of strip produced by the method illustrated in FIGURES 2 and 3.

Referring to FIGURE 1, the strip comprises a mild steel backing layer 11 (identified by specification No. SAE 1010), an intermediate layer 12, and a surface bearing layer 13. The layers have the following compositions:

The steel backing layer:
  Carbon _____ .08%.
  Manganese _____ .3%.
  Silicon _____ .01%.
  Sulphur _____ .03%.
  Phosphorus _____ .03%.
  Iron and impurities _____ Remainder.

The intermediate layer:

| | |
|---|---|
| Lead | 28%. |
| Tin | 0.1%. |
| Iron | 0.3%. |
| Indium | 0.1%. |
| Copper and impurities | Remainder. |

The surface bearing layer:

| | |
|---|---|
| Indium | 5%. |
| Copper | 0.2%. |
| Tellurium | 0.05%. |
| Lead and impurities | Remainder. | and thicknesses (in thousandths of an inch) or 80, 12 and 2 severally.

Referring now to FIGURE 5, there is shown diagrammatically, a section through the layers of the strip (magnification ×200). The layer 11 is part of the steel backing layer. The layer 12 is the full thickness of the intermediate layer with the lead dispersed in irregularly shaped pools 12a throughout the matrix. The layer 13 is the full thickness of the surface bearing layer. Between layers 12 and 13 is an irregular thin band 14 which is the zone of diffusion of indium from the surface bearing layer into the intermediate layer.

FIGURE 6 is a section (magnification ×800) through the layer 13 and part of the band 14. The grain boundaries of the lead-indium alloy are shown as an irregular network of lines 15, and the large acicular and small intermetallic particles 16 and 17 consist of copper, indium and tellurium, the large particles 16 being those precipitated while the lead-indium is still completely molten, and the small particles 17 those precipitated between the liquidus and solidus of the alloy.

The process illustrated in FIGURES 2 and 3 is as follows:

The rolled mild steel strip passes from a coil 21 to be cleaned and degreased in a solvent bath 22 (or, if desired, by passing through solvent vapour, or by any other method), and then passes through a furnace 23 where it is heated to a temperature of 1000–1200° C. in a reducing atmosphere of 10% hydrogen, 10% carbon monoxide, and the remainder nitrogen, the dew point being maintained below 5° C. The hot steel strip, still within this atmosphere then passes into a casting unit where it forms the continuously moving base of a box 24 into which molten copper alloy is poured. The emergent strip passes over a series of oil or water sprays 25 which quench the strip so that the copper alloy solidifies on the surface of the steel to form a bimetallic strip. The quenching is continued until the strip is at a temperature of 20° C. The bronze surface is then accurately machined and rolled to a thickness of twelve thousandths of an inch by milling cutter 26 and smoothing rollers 27 and is re-coiled. The casting process and apparatus for carrying it out are described in greater detail in British Patents Nos. 437,199, 533,434, 534,171 and 543,383.

Referring to FIGURE 3, the bimetallic strip produced as just described, passes from a coil 31 to be cleaned and degreased in bath 32 (or otherwise, if desired) and then passes through a furnace 33 where it is heated to a temperature of 650° C. in a reducing atmosphere similar to that described above. The heated strip, still in this atmosphere passes into a casting unit 34 similar to unit 24 (FIGURE 2) where molten lead alloy at 450° C. is poured onto and spread over the copper alloy surface. The lead alloy comprises 5% indium, .05% tellurium and the remainder lead. Approximately 1½ seconds after passing through the casting unit, the strip passes over water sprays 35 in FIG. 3 which cool the strip and solidify the lead alloy. The cooling is continued down to 20° C. which temperature is attained in 3 seconds. The strip subsequently passes under a series of fixed knives 36 which skive off the surface of the lead alloy to leave a uniform thickness of the alloy on top of the copper alloy. At this stage, the thickness of the lead alloy is ten thousandths of an inch. The composite strip then passes through smoothing rollers 37 and is coiled.

The strip is afterwards blanked and formed into bearings, which are ultimately finish machined so that the surface bearing layer is two thousandths of an inch thick. FIGURE 4 shows a section through an assembled bearing showing the strip in position with the bearing layer 13 innermost.

We claim:
1. In the manufacture of a composite strip for use in the manufacture of bearings, the steps of
  (a) melting an alloy containing copper and lead,
  (b) heating in a reducing atmosphere a steel backing strip to a temperature of 1000–1200° C.,
  (c) applying said melted alloy of copper and lead in a coating onto said backing strip,
  (d) cooling said backing strip with said coating to approximately 20° C.,
  (e) machining and rolling said coating to a selected thickness,
  (f) coiling the composite strip into a coil,
  (g) melting an alloy containing lead and indium,
  (h) uncoiling the said coil and heating in a reducing atmosphere said backing strip with said coating to a temperature between the melting points of the said copper and lead alloy and of the said lead and indium alloy,
  (i) applying said melted alloy of lead and indium in a layer onto said coating of said backing strip,
  (j) and thereafter cooling the backing strip with said coating and said layer of lead and indium alloy thereon to substantially room temperature in a selected short time so that controlled transfer of indium from said layer into said coating and transfer of copper from said coating into said layer is effected and the surface bearing layer produced is of sufficient thickness for finish-machining to approximately two-thousandths of an inch thick.

2. In the manufacture of a composite strip for use in the manufacture of bearings, the steps of
  (a) melting an alloy containing copper and lead,
  (b) heating in a reducing atmosphere a steel backing strip comprising 0.04–0.13% carbon, 0.25–0.45% manganese, up to 0.015% silicon, up to 0.05% sulphur, up to 0.05% phosphorus, all by weight, and the remainder iron and impurities, to a temperature above the melting point of the said copper and lead alloy,
  (c) applying said melted alloy of copper and lead in a coating onto said backing strip,
  (d) cooling said backing strip with said coating to substantially room temperature,
  (e) machining and rolling said coating to a desired thickness,
  (f) coiling the composite strip into a coil,
  (g) melting an alloy containing lead and indium,
  (h) uncoiling the said coil and heating in a reducing atmosphere said backing strip with said coating to a temperature between the melting points of the said copper and lead alloy and of the said lead and indium alloy,
  (i) applying said melted alloy of lead and indium in a layer onto said coating of said backing strip,
  (j) and thereafter cooling the backing strip with said coating and said layer of lead and indium alloy thereon to substantially room temperature in a selected short time so that controlled transfer of indium from said layer into said coating and transfer of copper from said coating into said layer is effected and the surface bearing layer produced is of sufficient thickness for finish-machining to approximately two-thousandths of an inch thick.

3. In the manufacture of a composite strip for bearings, the steps of
  (a) melting a lead/indium alloy consisting of 2% to 10% indium, 0.001% to 0.25% tellurium, and the remainder lead, said lead/indium alloy having a first melting point, (b) delivering into a furnace a steel backing strip having thereon a coating of a lead/copper alloy which consists of 5 to 35% lead, 0 to 20% of a metal selected from the group consisting of zinc and tin, 0 to 0.60% iron, the remainder being copper, said lead/copper alloy having a second melting point which is higher than said first melting point, and heating said strip and its coating in said furnace to a temperature between said first and second melting points, there being a reducing atmosphere within said furnace, (c) applying on said coating of said backing strip whilst heated to said temperature a layer of said molten lead/indium alloy, (d) and thereafter cooling the backing strip, the coating and the layer from said temperature to substantially room temperature in a time selected so that controlled transfer of indium occurs from the layer to the coating and so that controlled transfer of copper occurs from the coating to the layer to give a copper content to the layer of 0.1% to 3%.

4. In the manufacture of a composite bearing, the steps of (a) melting an alloy containing copper and lead,
(b) heating in a reducing atmosphere a steel backing strip comprising 0.04–0.13% carbon, 0.25–0.45% manganese, up to 0.015% silicon, up to 0.05% sulphur, up to 0.05% phosphorous, all by weight, and the remainder iron and impurities, to a temperature above the melting point of said copper and lead alloy,
(c) applying said melted alloy of copper and lead in a coating onto said backing strip,
(d) cooling said backing strip with said coating to substantially room temperature,
(e) machining and rolling said coating to selected dimensions,
(f) coiling the composite strip into a coil,
(g) melting an alloy containing lead and indium,
(h) uncoiling and heating in a reducing atmosphere said backing strip with said coating to a temperature between the melting points of the said copper and lead alloy and of the said lead and indium alloy,
(i) applying said melted alloy of lead and indium in a layer onto said coating of said backing strip,
(j) thereafter cooling the backing strip with said coating and said layer of lead and indium alloy thereon to substantially room temperature in a selected short time so that controlled transfer of indium from said layer into said coating and transfer of copper from said coating into said layer is effected,
(k) mechanically removing the surface of the lead and indium alloy layer to a thickness of approximately ten-thousandths of an inch,
(l) rolling the strip to smooth the composite strip,
(m) coiling the composite strip,
(n) blanking the composite strip,
(o) forming each of said blanks into bearings, and
(p) finish-machining each of said bearings so that the surface bearing layer is approximately two-thousandths of an inch thick.

5. In the manufacture of a composite bearing, the steps of (a) melting an alloy containing copper and lead,
(b) heating in a reducing atmosphere a steel backing strip to a temperature of 1000–1200° C.,
(c) applying said melted alloy of copper and lead in a coating onto said backing strip,
(d) cooling said backing strip with said coating to approximately 20° C.,
(e) machining and rolling said coating to selected dimensions,
(f) coiling the composite strip into a coil,
(g) melting an alloy containing lead and indium,
(h) uncoiling and heating in a reducing atmosphere said backing strip with said coating to a temperature between the melting points of the said copper and lead alloy and of the said lead and indium alloy,
(i) applying said melted alloy of lead and indium in a layer onto said coating of said backing strip,
(j) thereafter cooling the backing strip with said coating and said layer of lead and indium alloy thereon to substantially room temperature in a selected short time so that controlled transfer of indium from said layer into said coating and transfer of copper from said coating into said layer is effected,
(k) mechanically removing the lead and indium alloy surface to a thickness of approximately ten-thousandths of an inch,
(l) coiling the composite strip, and
(m) fashioning into bearings so that the lead and indium layer is approximately two-thousandths of an inch thick.

6. In the manufacture of a composite bearing, the steps of (a) melting an alloy containing copper and lead,
(b) heating in a reducing atmosphere a steel backing strip comprising 0.04–0.13% carbon, 0.25–0.45% manganese, up to 0.015% silicon, up to 0.05% sulphur, up to 0.05% phosphorous, all by weight, and the remainder iron and impurities, to a temperature above the melting point of said copper and lead alloy,
(c) applying said melted alloy of copper and lead in a coating onto said backing strip,
(d) cooling said backing strip with said coating to substantially room temperature,
(e) machining and rolling said coating to selected dimensions,
(f) melting an alloy containing lead and indium,
(g) heating in a reducing atmosphere said backing strip with said coating to a temperature between the melting points of the said copper and lead alloy and of the said lead and indium alloy,
(h) applying said melted alloy of lead and indium in a layer onto said coating of said backing strip,
(i) thereafter cooling the backing strip with said coating and said layer of lead and indium alloy thereon to substantially room temperature in a selected short time so that controlled transfer of indium from said layer into said coating and transfer of copper from said coating into said layer is effected,
(j) mechanically removing the surface of the lead and indium alloy layer to a thickness of approximately ten-thousandths of an inch,
(k) rolling the strip to smooth the composite strip,
(l) blanking the composite strip,
(m) forming each of said blanks into bearings, and
(n) finish-machining each of said bearings so that the surface bearing layer is approximately two-thousandths of an inch thick.

7. In the manufacture of a composite bearing, the steps of (a) melting an alloy containing copper and lead,
(b) heating in a reducing atmosphere a steel backing strip to a temperature of 1000–1200° C.,
(c) applying said melted alloy of copper and lead in a coating onto said backing strip,
(d) cooling said backing strip with said coating to approximately 20° C.,
(e) machining and rolling said coating to selected dimensions,
(f) melting an alloy containing lead and indium,
(g) heating in a reducing atmosphere said backing strip with said coating to a temperature between the melting points of the said copper and lead alloy and of the said lead and indium alloy,
(h) applying said melted alloy of lead and indium in a layer onto said coating of said backing strip,
(i) thereafter cooling the backing strip with said coating and said layer of lead and indium alloy thereon to substantially room temperature in a selected short time so that controlled transfer of indium from said layer into said coating and transfer of copper from said coating into said layer is effected, (j) mechanically removing the lead and indium alloy surface to a thickness of approximately ten-thousandths of an inch, and (k) fashioning into bearings so that the lead and indium layer is approximately two-thousandths of an inch thick.

8. In the manufacture of a composite bearing, the steps of (a) melting an alloy containing copper and lead, (b) heating in a reducing atmosphere a steel backing strip comprising 0.04–0.13% carbon, 0.25–0.45% manganese, up to 0.015% silicon, up to 0.05% sulphur, up to 0.05% phosphorous, all by weight, and the remainder iron and impurities, to a temperature above the melting point of said copper and lead alloy, (c) applying said melted alloy of copper and lead in a coating onto said backing strip, (d) cooling said backing strip with said coating to substantially room temperature, (e) machining and rolling said coating to selected dimensions, (f) melting an alloy containing lead and indium, (g) heating in a reducing atmosphere said backing strip with said coating to a temperature between the melting points of the said copper and lead alloy and of the said lead and indium alloy, (h) applying said melted alloy of lead and indium in a layer onto said coating of said backing strip, (i) thereafter cooling the backing strip with said coating and said layer of lead and indium alloy thereon to substantially room temperature in a selected short time so that controlled transfer of indium from said layer into said coating and transfer of copper from said coating into said layer is effected, (j) mechanically removing the surface of the lead and indium alloy layer to a thickness of approximately ten-thousandths of an inch, (k) rolling the strip to smooth the composite strip,, (l) blanking the composite strip, (m) forming each of said blanks into bearings, and (n) finish-machining each of said bearings so that the surface bearing layer is approximately two-thousandths of an inch thick.

9. In the manufacture of the composite bearing, the steps of (a) melting an alloy containing copper and lead, (b) heating in a reducing atmosphere a steel backing strip to a temperature of 1000–1200° C., (c) applying said melted alloy of copper and lead in a coating onto said backing strip, (d) cooling said backing strip with said coating to approximately 20° C., (e) machining and rolling said coating to selected dimensions, (f) melting an alloy containing lead and indium, (g) heating in a reducing atmosphere said backing strip with said coating to a temperature between the melting points of the said copper and lead alloy and of the said lead and indium alloy, (h) applying said melted alloy of lead and indium in a layer onto said coating of said backing strip, (i) thereafter cooling the backing strip with said coating and said layer of lead and indium alloy thereon to substantially room temperature in a selected short time so that controlled transfer of indium from said layer into said coating and transfer of copper from said coating into said layer is effected, (j) mechanically removing the lead and indium alloy surface to a thickness of approximately ten-thousandths of an inch, and (k) fashioning into bearings so that the lead and indium layer is approximately two-thousandths of an inch thick.

References Cited by the Examiner

UNITED STATES PATENTS

| | | | |
|---|---|---|---|
| 1,956,464 | 4/34 | Palm | 29—149.5 |
| 1,956,467 | 4/34 | Palm | 29—149.5 |
| 2,267,342 | 12/41 | Schartz et al. | 29—149.5 X |
| 2,283,580 | 5/42 | Sandler | 29—149.5 |
| 2,333,227 | 11/43 | Bagley | 29—149.5 |
| 2,386,951 | 10/45 | Howe | 29—149.5 |
| 2,446,996 | 8/48 | Bouton | 29—196.6 |
| 2,687,565 | 8/54 | Schaefer | 29—527 |
| 2,704,884 | 3/55 | Ingels | 29—527 |
| 2,752,667 | 7/56 | Schaefer | 29—196.6 |

WHITMORE A. WILTZ, *Primary Examiner.*

HYLAND BIZOT, THOMAS H. EAGER, *Examiners.*